United States Patent [19]

Wesley, Jr.

[11] Patent Number: 4,773,952
[45] Date of Patent: Sep. 27, 1988

[54] NONMETALLIC CYLINDRICAL CRYOGENIC CONTAINER

[75] Inventor: Ronald C. Wesley, Jr., Cardiff, Calif.

[73] Assignee: Biomagnetic Technologies, Inc., San Diego, Calif.

[21] Appl. No.: 80,880

[22] Filed: Aug. 3, 1987

[51] Int. Cl.$^4$ .............................................. B31C 3/00
[52] U.S. Cl. .................................. 156/191; 156/245; 220/3; 220/414
[58] Field of Search .............................. 156/189–192, 156/245, 173, 171, 175, 446; 220/3, 414, 420

[56] References Cited

U.S. PATENT DOCUMENTS

| | | | |
|---|---|---|---|
| 2,718,583 | 9/1955 | Noland et al. | 156/224 X |
| 3,392,865 | 7/1968 | Dryden | 220/414 |
| 3,508,677 | 4/1970 | Laibson et al. | 220/3 |
| 3,604,587 | 9/1971 | Pechacek | 220/3 |
| 4,007,075 | 2/1977 | McClain et al. | 156/190 X |
| 4,398,646 | 8/1983 | Pechacek | 220/3 |
| 4,579,617 | 4/1986 | Oberg et al. | 156/190 X |
| 4,602,722 | 7/1986 | Ives | 220/414 |

Primary Examiner—David Simmons
Attorney, Agent, or Firm—Gregory O. Garmong

[57] ABSTRACT

A vacuum-tight nonmetallic Dewar component is fabricated from composite material of nonmagnetic fibers in a resin matrix. The component is cylindrical with a closed end, and is laid up from sheets of the composite material and circles cut from the sheets to form the closed end. The layers are mechanically worked and debulked repeatedly during layup between the addition of successive layers, to remove irregularities that can cause vacuum leaks. The joints between the sheets applied to the cylindrical surface and the circular end pieces are mechanically worked to effect a vacuum-tight seal, and the joints are staggered as between succeeding layers for strength and integrity. The laid up and debulked piece is finally cured.

13 Claims, 1 Drawing Sheet

NONMETALLIC CYLINDRICAL CRYOGENIC CONTAINER

BACKGROUND OF THE INVENTION

This invention relates to cryogenic containers for use at temperatures near to absolute zero, and, more particularly, to such containers made of a nonmetallic material to have low magnetic susceptibility.

In several branches of science, instruments or objects under study must be maintained at a low temperature, as within a few degrees of absolute zero. Superconducting instruments for measuring magnetic phenomena are operated at a temperature where superconductivity can occur, which for presently available commercial superconductor materials is typically less than about 10K., or about 450F. below zero. As might be expected, special techniques must be used to maintain instruments at such low temperatures for long periods of time.

In most laboratories, an instrument is maintained at such a low temperature by placing it into a bath of liquid helium, at a temperature of only 4.2K., or by placing it into an enclosure otherwise cooled to the superconducting temperature. The bath of liquid helium would vaporize almost instantaneously due to heat conducted from the surroundings, were the bath not maintained in a well-insulated container to reduce heat flow.

A commonly available container for holding such low temperature liquids is termed a Dewar flask, or simply a Dewar, after its inventor. A typical Dewar includes a metallic or glass inner container and a metallic or glass outer container, with a vacuum drawn on the space between the two containers. The surfaces of the containers are silvered, to reflect radiated heat and prevent radiative heat transfer, and the vacuum between the containers insulates against conductive and convective heat transfer. The Dewar is thus a sophisticated vacuum bottle for maintaining a cold interior.

Most commercially available Dewars are constructed either of metals or of thick, silvered glass. This construction is acceptable for many uses, but cannot be readily used in certain applications wherein instruments within the container are to measure small magnetic signals from sources outside the Dewar, and where the instrument should be placed as close as possible to the source of the signals. An instrument having these highly specialized requirements is a Neuromagnetometer ® type biomagnetometer (manufactured by Biomagnetic Technologies, Inc., San Diego, CA), a highly sensitive magnetic measurement device capable of noninvasively measuring very small magnetic signals originating within the human body. The magnitude of the magnetic signals measured by this apparatus is typically less than 1/10,000,000 of the magnitude of the earth's magnetic field.

The instrumentation which measures the small magnetic field originating from the body must be operated at superconducting temperature, but also must be placed as closely as possible to the body of the patient being measured. The instrumentation must therefore be placed within a cryogenic container in the form of a Dewar or similar structure. However, the instrumentation cannot be separated from the body by a metallic or metal-coated structure as found in a conventional Dewar because of magnetic noise considerations. The container must neither generate magnetic artefacts, nor distort or attenuate the field being measured. It must have relatively thin walls to minimize the distance of separation of the instrumentation from the body. The container must be vacuum tight to hold an insulating vacuum therein, and must have sufficient mechanical stiffness and strength in its inner and outer walls to withstand normal handling forces and also the forces arising from the pressure differential across the walls.

There is therefore a need for a cylindrical cryogenic container which does not interfere with the taking of magnetic data from sources outside the container, is thin-walled, vacuum tight, and which may be used to maintain instruments at cryogenic temperatures. The present invention fulfills this need, and further provides related advantages.

SUMMARY OF THE INVENTION

The present invention provides a construction method and structure of a cylindrical cryogenic container that is closed on one end with a concave curvature, and has good strength and stiffness in a thin-walled vessel so that the vessel is not greatly deformed and can be placed closely adjacent a patient being measured. The container is nonmetallic and constructed of a material having substantially zero magnetic susceptibility, so that there is essentially no interference with the measurement of external magnetic fields through the walls of the container. The walls of the container are vacuum tight, as has been confirmed with helium leak testing. Two of the containers, one of larger diameter and length than the other, can be assembled together with the smaller inside the larger and with a seal therebetween, to form a vacuum tight Dewar to maintain the interior at cryogenic temperatures.

In accordance with the invention, a process for preparing a vacuum-tight, nonmetallic cylindrical cryogenic container closed at one end, comprises the steps of preparing a cylindrical mandrel having a cylindrical diameter; furnishing a plurality of circular pieces of glass fiber composite material, each piece having a diameter greater than the cylindrical diameter; applying a plurality of sheets of glass fiber composite material to the cylindrical surface of the mandrel and the plurality of circular pieces of glass fiber composite material to the end of the mandrel in a layup operation to form a series of layers, alternating the sheets and circular pieces and trimming the circular pieces to form butt joints with the sheets along the cylindrical surface, while axially staggering the seams between the sheets and circular pieces; mechanically working and debulking the sheets and circular pieces to avoid folds therein, and mechanically working the seams between the sheets and circular pieces to effect a vacuum-tight joint therebetween, the mechanical working to occur at intermediate stages of the layup procedure; and curing the laid-up piece under compression applied perpendicularly to the layers of glass fiber composite.

With conventional cryogenic containers made of metal or glass, structural strength and stiffness, vacuum tightness, and fabrication are not normally of concern, because these qualities are readily attained. If the materials of construction are restricted to nonmetallics having substantially no susceptibility, so that the necessary magnetic measurements can be made, then strength, stiffness, vacuum tightness, and the ability to fabricate a cylindrical container become important factors in the selection of a material and the approach used to fabricate the cylinder.

Epoxies and other types of polymers can be used as materials of construction, as they do exhibit the necessary low interference with magnetic signals. However, no known polymers have the strength or stiffness, in a cast or worked cylindrical container form, to maintain the shape of the container when a vacuum is applied interiorly or exteriorly.

Composite materials having reinforcement fibers within a polymer matrix can be selected to satisfy the requirement of an absence of interference with the magnetic signal, and also to have the necessary strength and stiffness. Such materials are commercially available as sheets of the reinforcement fibers embedded in an uncured or partially cured thermoset polymer matrix, the sheets being known as "prepreg". The composite material can also be prepared by filament winding the fibers onto a form and infiltrating a matrix material, or winding a preinfiltrated filament material onto a form. The winding technique is often used to make large vessels, but requires special, complex machinery and is difficult to use in making the small container required. Sheets of prepreg are therefore preferably used in the approach disclosed herein.

In manufacturing the container of the invention, pieces of prepreg are arranged onto a mandrel having the shape of the container, one layer at a time. A sufficient number of layers of prepreg to yield the required strength and stiffness is "laid up" onto the mandrel, and then cured under heat and compression.

The fabrication of the container from a composite material requires special care to achieve a vacuum tight construction. Because the container is formed of a number of sheets laid up overlying and laterally adjacent each other, there are a large number of seams that are potential leak paths. Moreover, in preliminary studies, it has been shown that upwardly projecting folds in the prepreg formed during layup may be retained in the cured composite container, and that these folds may themselves cause leaks.

The fabrication of the container without folds or leaky seams is particularly difficult in view of the requirement of a vacuum tight end closure at one end of the cylindrical container, and the small cylindrical diameter of the container, which is normally on the order of about 3.5 inches. The sheets of prepreg are somewhat stiff and nonflexible even prior to curing. There is usually no difficulty in forming the sheets onto the cylindrical surface of the mandrel, but because of the stiffness it is difficult to form the sheets over the shape of the end of the mandrel to form the end closure, while simultaneously avoiding the folds and incomplete seams that can lead to vacuum leaks.

It might be expected that a vacuum tight construction could be achieved most readily by making each prepreg layer of a unitary construction, so that there would be no lateral seams that could leak. It has not been possible to achieve such a construction due to the need to bend the sheet over the end of the cylinder to effect a bottom closure. Instead, the most effective construction utilizes multiple pieces of prepreg in each layer, and careful attention to avoiding folds and incomplete seams.

In the cylinder construction of the invention, the sidewalls are made of a series of overlying layers of the prepreg. The bottom closure is achieved by cutting out circles of the prepreg having a diameter slightly larger than the diameter of the cylindrical mandrel, and laying up these circles onto the end of the mandrel. The prepreg is slightly tacky or sticky, permitting such a layup procedure. The circle end closure of each layer is trimmed to form a butt joint or seam with the corresponding layer of prepreg on the cylinder sidewall, with the butt joint lying on the sidewall of the cylinder. Occasional extra layers can be added to the sidewall or the end closure layers to radially stagger the butt joints, further reducing possible leak paths. The seam at the butt joint is mechanically worked, typically by hand with a tool, to force the resin and fibers of the sidewall prepreg layer and the resin and fibers of the circular end closure to intermix.

The structure of the cylinder is formed by adding a series of such layers, one over the other, until a sufficient number is achieved for strength, stiffness, and vacuum tightness. Typically, about 7 to 11 layers of glass-polymer composite material are required, but this number can be varied to meet particular strength and size requirements. As the layers are added, the seams are staggered axially along the cylinder, so that the seams in succeeding layers do not lie on top of each other.

The composite prepreg is usually provided as a bidirectional cloth, with the fibers arranged into two groups, at 90 degrees to each other. The cloth is preferably laid up on the cylindrical side walls with the fibers in a first layer at a 45 degree angle to the cylindrical axis. Then, in succeeding layers, the cloth is laid up with the fibers in that layer oriented at 45 degrees to those in the prior layer. The alternating layup scheme promotes relative movement of the layers during subsequent mechanical working and debulking, so that the composite cylinder has a sound, vacuum-tight construction.

As the layers of composite material are added, they are compressed onto the underlying mandrel and underlying layers of composite material to reduce and eliminate any voids that might otherwise be present. Such voids cause an upward fold or irregularity in the composite layer, which can later lead to a fold in the final composite cylnder that provides a vacuum leak path. Compression is preferably achieved by one of two approaches, or a combination thereof. A shrink tape can be wound tightly over the composite layer. The mandrel and partially completed composite piece can also be placed into a compression vessel that produces a compressive stress perpendicular to the layers.

These techniques mechanically work the laid-up composite prepreg into a succession of tight, conforming layers, and thence decrease the total size of the structure at that point, a process termed debulking. Preferably, mechanical working and debulking are performed after each layer of prepreg is added. As the person preparing the composite cylinder gains skill in avoiding folds in the laid-up composite layers, it is possible to use debulking less frequently.

When all layers have been laid up, the composite material is cured under compression to strengthen the polymer matrix, bond the overlying layers to each other, and bond the seams. The composite is heated to its curing temperature while being compressed perpendicularly, causing further debulking and elimination of potential folds or voids.

When a wet layup rather than prepreg is used, the composite material is preferably not cured to its full hardness, and instead retains more elongation than might ordinarily be obtained in a composite to be used in a structural application. The reason for the undercuring is to achieve some degree of flow when the composite is cooled to a cryogenic temperature. During the cooling process, the coefficient of thermal expansion difference between the adjacent fibers and polymer, and between adjacent layers, can create thermal stresses and strains within the cylinder walls. A degree of flowability of the matrix aids in relieving such stresses and strains.

It will be appreciated that the approach of the invention produces a composite cylinder construction that permits magnetic measurement devices to be maintained in a cryogenic environment, yet be positioned closely to an external magnetic source for measurements of that source. Two of the cylinders, one larger than the other, are prepared by the described process, fitted together with the smaller inside the larger, and sealed together at the open end to produce a vacuum tight space therebetween. The vacuum is drawn on this space, resulting in an insulated Dewar construction which does not deflect to an unacceptable degree or fail when repeatedly heated and cooled, and maintains the vacuum seal.

Other features and advantages of the invention will be apparent from the following more detailed description, taken in conjunction with the accompanying drawings, which illustrate, by way of example, the principles of the invention.

DETAILED DESCRIPTION OF THE PREFERRED EMBODIMENT

Figure 1:
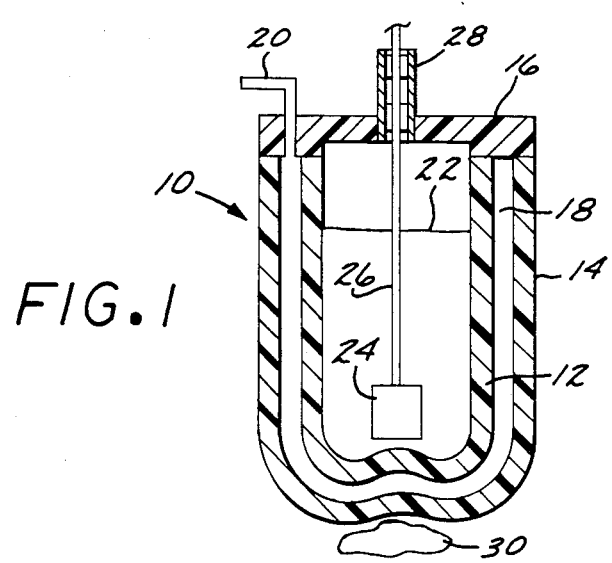
FIG. 1 is a side sectional view of a Dewar construction.

The present invention is embodied in structures useful in constructing a Dewar flask 10, as illustrated in FIG. 1. The Dewar flask 10 includes a cylindrical inner container 12 and a larger cylindrical outer container 14 that fits over and encloses the inner container 12. In a typical Dewar flask used in a biomagnetic measurement system, the cylindrical diameter of the inside surface of the inner container 12 is about 3.5 inches, and the cylindrical diameter of the inside surface of the outer container 14 is about 4.9 inches. The bottoms of the inner container 12 and the outer container 14 are closed with an end surface that is concave inwardly.

An upper closure 16 closes the tops of the containers 12 and 14, and forms a vacuum-tight seal of a vacuum space 18 between the outer wall of the inner container 12 and the inner wall of the outer container 14. An evacuation line 20 extends through the upper closure 16 into the vacuum space 18, so that the vacuum space 18 can be evacuated by a vacuum pump (not shown). The vacuum space 18, when evacuated, prevents heat loss from the interior of the inner container 12 by conduction and convection.

The inner container 12 contains a cryogenic fluid such as liquid helium to a fluid level 22. An instrument package 24 is immersed in the cryogenic fluid. The instrument package 24 is supported by a support 26 that extends upwardly through a neck 28 in the upper closure 16. The sides and bottoms of the containers 12 and 14 are desirably as thin as possible so that the instrument package 24 may be positioned close to a magnetic source 30 located outside of the Dewar flask 10. On the other hand, the sides and bottoms of the containers 12 and 14 must be sufficiently rigid and strong that they do not buckle or fail under the loading imposed by the contained cryogenic fluid and the atmospheric forces caused by the vacuum between the containers. The containers must also be vacuum tight to contain the vacuum, which is a vital part of the insulation system.

The present invention is concerned with the construction of the containers 12 and 14. The remaining discussion will focus on the inner cylindrical container 12, but the same principles apply to the construction of the outer cylindrical container 14.

The walls of the container 12 are fabricated from a plurality of layers of a prepreg composite material. In the preferred embodiment, the composite material is formed of quartz glass fibers within a nonmagnetic, thermocuring epoxy polymer resin matrix. The quartz glass fibers preferably comprise about 60 percent by volume of the composite material, but the volume percent is not critical to operability. An acceptable material is available commercially (on special order) in prepregs about 0.016 inches thick and from 12 to 36 inches wide, with a matrix of 7701 epoxy and 581 quartz fibers, from Fiberite Co., Orange, Calif. These prepregs have the fibers arranged in groups oriented at 90 degrees to each other, to form a bidirectionally reinforced cloth.

Figure 2:
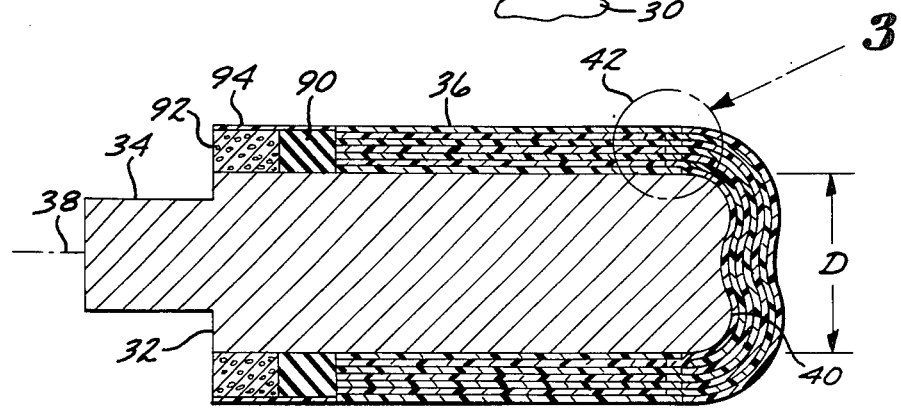
FIG. 2 is an enlarged sectional view through the wall of a composite cylinder prior to curing, illustrating the arrangement of the composite layers.
Figure 3:
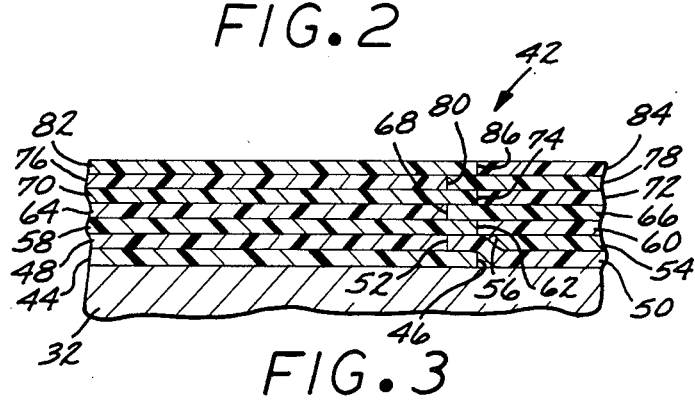
FIG. 3 is a further enlarged section of a portion of FIG. 2, in the area indicated by the numeral 3, illustrating the staggered seam arrangement.

The mode of construction of the container 12 is illustrated in FIG. 2, with an enlargement of the seam portion illustrated in FIG. 3. FIGS. 2 and 3 show the construction prior to curing, while the structures of FIG. 1 are illustrated after curing. In FIG. 2, the inner container 12 (prior to curing) is shown supported on a mandrel 32, upon which it is fabricated. The mandrel 32 has a shape and size corresponding to the inner surface of the container 12 at the completion of the layup of the composite prepreg layers. The cylindrical diameter of the mandrel 32 is indicated by the letter D in FIG. 2. The mandrel 32 includes an extension 34 which is grasped in the chuck of a lathe (not shown) that is turned by hand to permit access to all sides of the mandrel 32. Prior to applying any of the composite material, the surface of the mandrel 32 is preferably coated with a mold release agent such as Frekote 44, so that the composite material does not stick to the aluminum of the mandrel 32.

A plurality of layers of the composite material are applied over the surface of the mandrel 32. The composite material is applied in two forms. Sheets of the composite material are applied over a cylindrical surface 36 of the mandrel 32. These sheets are applied with the quartz fibers lying in the plane of the surface, but preferably displaced from the cylindrical axis 38 of the cylindrical mandrel 32 in the first layer nearest to the mandrel surface. In succeeding layers, the fibers are preferably angularly displaced to lie at 45 degrees from the fibers in the previous layer. This displacement gives good biaxial strength for the cylindrical container 12, and also permits movement of the fibers relative to each other during subsequent compacting by mechanical working and debulking.

Circular cutouts from the composite sheets are applied over the end 40 of the mandrel 32 to form the bottom closure of the cylinder 12. A circular cutout having a diameter greater than the cylindrical diameter D of the mandrel 32 is cut from the sheet of composite material. As an example, where the diameter D is 3.5 inches, the diameter of the composite circles is selected to be about 6 inches, so that the circle may be handled readily.

The circular cutouts are applied in conjunction with the sheets applied to the cylindrical surfaces 36, as illustrated in FIG. 2. The end of the circular cutout is butted against the end of the composite layer on the cylindrical surface to form a seam, as illustrated in FIG. 3, which shows a seam region 42 of FIG. 2 in greater detail.

In the illustrated preferred embodiment, a first cylindrical layer 44 of the composite sheet material is applied to the cylindrical surface 36, preferably with the fibers at a +45 degree orientation to the cylindrical axis 38. An end 46 of the layer 44 is positioned at a point on the cylindrical surface 36, not on the end. Several windings of 0.002 inch thick Wrightlon 7500 shrink tape, available from Airtech Plastic Products, Carson, Calif., are wound tightly over the first cylindrical layer 44. The shrink tape contracts in length slightly, applying a compressive force to the first cylindrical layer 44 and mechanically working it against the mandrel 32 to remove voids that might later become protruding folds.

Next, a second cylindrical layer 48 is applied over the layer 44, and a first end layer 50 is applied over the mandrel 32. The first end layer 50, a circle of the composite sheet material, is applied to the end of the mandrel 32 and manually molded to its contours. (The composite material sheets are slightly tacky to the touch, and are retained on the surface.) The sheet material of the first end layer 46 is trimmed so that it butts against the second cylindrical layer 48 to form a first butt seam 52 overlying the layer 44 and displaced from the end 46, as illustrated in FIG. 3. The seam 52 is then mechanically worked with a tool to cause the fiber and matrix materials of the layers 48 and 50 to intermix at the seam 52. The mechanical working results in better vacuum tightness at the final seam in the cured cylinder.

A second end layer 54 is applied over the layer 50 so that its end 56 butts against layer 50 at the point where the layer 50 deflects to overlie the layer 44, and is mechanically worked into place manually or with shrink tape. The radially and axially staggered arrangement of seams and joints produced by this layup approach aids in reducing possible leak paths. The second cylindrical layer 48 and second end layer 54 are applied with their fibers at 45 degrees to those of the first cylindrical layer 44 and the first end layer 50, respectively. This alternating pattern is continued with the remainder of the cylindrical and end layers.

The mandrel 32 with the layers 44, 48, 50 and 54 in place is then loaded into a debulking apparatus to further compress and work the layers. The apparatus includes a rubber bladder that fits over the layers of fiberglass, and is inflated to apply a compressive pressure perpendicular to the layers of up to about 50 to 100 pounds per square inch. With experience in applying the layers of fiberglass, it is possible to gauge by eye the need for debulking, and to omit the debulking step for some of the layers that are applied. However, for the preferred approach wherein 7-11 layers are applied, debulking should be done at least three times.

A third cylindrical layer 58 and a third end layer 60 are applied over the previously applied layers, and butted together at a third seam 62. The third seam 62 is axially offset from the second seam 52, which further reduces the chance of a vacuum leak path in the final cylinder. A fourth cylindrical layer 64 and a fourth end layer 66 are then applied and butted together at a fourth seam 68, which is again axially staggered from the position of the seam 62 in the preceding layer. A fifth cylindrical layer 70 and fifth end layer 72 are added in a similar manner, with a fifth seam 74 again axially staggered from the seam 68 in the preceding layer. A sixth cylindrical layer 76 and sixth end layer 78 are applied and butted together at a fifth seam 80. Finally, a seventh cylindrical layer 82 and a seventh end layer 84 are applied and butted together at a seventh seam 86. As illustrated in FIG. 3, the seams 80 and 86 are axially staggered from the seam in the preceding layer to avoid a continuous plane of weakness and a continuous leak path.

As each layer of fiberglass is added, it is mechanically worked and debulked as necessary in the manner previously indicated. Pressure debulking is typically done at least three times during fabrication. The seams are all individually worked, at the time the seams are formed, with a tool in the manner described to increase their integrity.

As illustrated, the seam in every layer is axially offset or staggered from the seam in the underlying and overlying layer, by an amount typically about 1 inch. The fiberglass pieces in the first and second layers are radially offset to further discourage formation of leak paths. Other layers can also be radially offset as necessary, but it has been found that the present arrangement is generally satisfactory.

Prior to and during the layup procedure, a supporting structure is formed at the upper end of the mandrel on its cylindrical surface. A silicone rubber dam 90 is formed as a ring. This dam 90 holds the layers of composite material in place and defines the upper end of the finished cylinder. A ring of breather cloth 92 to permit escape of gas from the composite material during curing is added on the cylindrical surface of the mandrel, above the dam 90. A layer of perforated teflon closes the outer surfaces of the dam 90 and the breather cloth 92 as another direct path for the escape of gas during curing.

The composite material of the cylinder is cured under compression according to the procedure appropriate for the selected matrix material. Compression is supplied by placing the composite back into the debulking apparatus and applying compressive pressure as next described. Curing for the preferred material is accomplished by heating the composite material to about 175F. and holding for 25 minutes. The temperature is then increased to 260F., and a compressive pressure of about 100 pounds per square inch applied. This pressure and temperature are maintained for 90 minutes, and the cured cylinder is cooled to ambient temperature.

A Dewar flask 10 is constructed by preparing two containers 12 and 14 by the method indicated, and then forming the vacuum space 18 by applying the closure 16 between the upper ends of the two containers 12 and 14. The outer container 14 normally has more layers of composite material in its walls, because of its larger size. Typically, the inner container 12 may have 7 layers, and the outer container 14 may have 11 layers.

Cylinders made according to this procedure have been leak checked with a helium leak mass spectrometer leak detector at ambient temperature and at liquid helium temperature, and in both cases found to be leak tight. The cylinders also have been tested and found to have substantially no influence on magnetic measurements made of external sources 30 by measurement apparatus 24 within the cylinders. The cylinders have acceptable strength and stiffness to withstand normal handling and the forces resulting from atmospheric pressures when used as both the inner container 12 and the outer container 14 in a configuration of the Dewar flask 10.

Although particular embodiments of the invention have been described in detail for purposes of illustration, various modifications may be made without departing from the spirit and scope of the invention. Accordingly, the invention is not to be limited except as by the appended claims.

What is claimed is:

1. A process for preparing a vacuum-tight, nonmetallic cylindrical cryogenic container closed at one end, comprising the steps of:

preparing a cylindrical mandrel having a cylindrical diameter;

furnishing a plurality of circular pieces of glass fiber composite material, each piece having a diameter greater than the cylindrical diameter;

applying a plurality of sheets of glass fiber composite material to the cylindrical surface of the mandrel and the plurality of circular pieces of glass fiber composite material to the end of the mandrel in a layup operation to form a series of layers, alternating the sheets and circular pieces and trimming the circular pieces to form butt joints with the sheets along the cylindrical surface, while axially staggering the seams between the sheets and circular pieces;

mechanically working and debulking the sheets and circular pieces to avoid folds therein, and mechanically working the seams between the sheets and circular pieces to effect a vacuum-tight joint therebetween, said mechanical working to occur at intermediate stages of the layup procedure; and curing the laid-up piece under compression applied perpendicular to the layers of glass fiber composite.

2. The process of claim 1, wherein said sheets are oriented so that at least some of the glass fibers are oriented at 45 degrees to the cylindrical axis.

3. The process of claim 1, wherein the mechanical working of the sheets is accomplished in part by a shrink tape wound over the sheets.

4. The process of claim 1, wherein said debulking is accomplished by applying a compressive force to the laid up part perpendicular to the glass fiber composite material.

5. The process of claim 1, wherein the glass fiber composite material includes glass fibers in an epoxy resin matrix.

6. The process of claim 1, wherein the glass fiber composite materials includes glass fibers made of quartz.

7. The process of claim 1, wherein the finished part includes from 7 to 11 layers of glass fiber composite material.

8. The process of claim 1, wherein the finished part includes 7 layers of glass fiber composite material.

9. The process of claim 1, wherein an extra inserted layer of the circular end pieces is provided to radially stagger at least a portion of the laid-up layers.

10. The process of claim 1, including the further step of preparing a second cylindrical fiberglass container of a cylindrical diameter different from that prepared by the process of claim 1.

11. The process of claim 10, including the further step of placing one cylindrical container within the other, and joining the tops of the containers by an upper closure to form a Dewar flask.

12. A container prepared by the process of claim 1.

13. A Dewar flask prepared by the process of claim 11.

* * * * *